Patented Aug. 6, 1940

2,210,175

UNITED STATES PATENT OFFICE 2,210,175

PROCESS FOR REACTING CHEMICAL MATERIALS

Fred Weaver Muncie, New Brunswick, N. J., assignor to Colgate-Palmolive-Peet Company, Jersey City, N. J., a corporation of Delaware No Drawing. Application June 24, 1937, Serial No. 150,105

12 Claims. (Cl. 260—686)

This invention relates to the reacting of chemical materials. More particularly, it relates to a process for reacting chemical materials, in which a gas or vapor is evolved. More particularly still, it relates to a process for reacting chemical materials in which a gas or vapor is evolved and in which the products of reaction or one of the reacting materials tend to retain the evolved gas or vapor as a foam. The invention is concerned particularly with the processing of materials to be used as detergents, wetting out agents, surface tension modifiers, foaming agents, emulsifiers and similar materials which are characterized by a tendency to foam.

In the preparation of such materials, the intermediate products are often produced in the form of acidic materials. Examples are: (1) fatty acids containing at least eight carbon atoms; (2) organic partial esters of oxygen containing inorganic acids, such as the acid reaction products of organic materials with sulfuric acid or phosphoric acid, oleum, $SO_3$, chlor-sulfonic acid. Of particular interest in connection with the present invention are: (1) fatty acids; (2) alkyl partial esters of sulfuric and phosphoric acids where the alkyl group may be straight or branched chain; (3) reaction products of fatty acid derivatives of compounds containing more than one hydroxyl group with sulfuric or phosphoric acid; (4) sulfonic acid derivatives of the same organic residues; (5) acid reaction products of petroleum fractions with sulfonating agents such as sulfuric acid, oleum, $SO_3$, chlorsulfonic acid; (6) acid reaction products of substituted ring compounds with sulfonating agents. It is not intended, however, to limit the scope of this invention other than that in the course of the reaction, a gas or vapor is evolved and one or more of the reacting materials or products of reaction has a tendency to retain the evolved gas or vapor as a foam.

The acid materials with which this invention is concerned may be reacted with an alkaline material containing an hydroxyl such as caustic soda or potash, ammonium hydroxide, an ethanolamine, in the course of which water is evolved and no gas is formed unless the reaction is carried out at a temperature above the boiling point of water at the pressure employed. Other materials, however, which have desirable characteristics such as lower cost or ability by the volatilization of a product of reaction to produce products with a greater solids content, may be employed, provided a suitable process for carrying out the reaction is used. Such materials may be those which evolve $CO_2$ or HCl or $SO_2$ or as stated above water itself at certain pressure-temperature conditions. Such reactions are not practically carried out, however, by the simple operation of mixing the ingredients, on account of the retention of the evolved gas or vapor as foam, resulting in the production of a mixture which has an undesirable lack of fluidity and poor heat transfer characteristics. The following are practical examples:

1. If fatty acids containing eight or more carbon atoms are mixed with an aqueous solution of soda ash at a temperature of 140 to 200° F., there results a stiff mass of soap containing the liberated $CO_2$. If the reaction be carried out above the boiling point of water at the pressure employed, water vapor aggravates the condition. Due to the lack of fluidity of the product, it has been found difficult to secure complete neutralization of the fatty acids with a small excess of soda.

2. If fatty acid mono-glyceride mono-sulfuric acid of the formula:

$$RCOO-CH_2-CHOH-CH_2-OSO_3H$$

where R contains eight or more carbon atoms, is reacted with an aqueous solution of soda ash at a temperature around 100° F., the reaction products retain the evolved $CO_2$ so tenaciously that after a short time a stiff mass is obtained which lacks the fluidity required for proper mixing, maintenance of pH control and removal of the heat of reaction.

Suitable materials to be reacted with the acid, foam-forming products described above are carbonates or bicarbonates which liberate $CO_2$ in the course of the reaction; sulfites, bisulfites or acid sulfites which liberate $SO_2$ or chlorides which liberate HCl. The cation may be a metal, ammonium or an organic amine.

The essence of the present invention lies in the following operations: (1) mixing the materials to be reacted in a mixing chamber; (2) removal of the whole or a part of the reacted products containing such gas or vapor as is retained as foam, into a device for separating the gas or vapor from the liquid; (3) cooling or heating the liquid fraction if desired; (4) returning the liquid partially or wholly freed from gas or vapor to the mixing chamber. In this manner, a body of reacted material of the temperature desired is supplied to the mixing chamber to serve as a medium in which the reaction is to take place, without the accumulation of an undesirable content of gas or vapor. Such a medium serves as a means for rapid adjustment of temperature at the point of reaction and as a body of liquid which may be used if desired as a means of testing the pH of the reaction mixture and thereby controlling the proportion of the constituents added.

As examples of reactions where such a process may be of value, the following are mentioned specifically:

(1) $2ROSO_3H + Na_2CO_3 = 2ROSO_3Na + H_2O + CO_2$ where R is the alkyl group of the alcohols formed by the reduction of fatty acids employed in soap making.

(2) $2R{-}COO{-}CH_2{-}CHOH{-}CH_2{-}OSO_3H + Na_2CO_3 =$
$2R{-}COO{-}CH_2{-}CHOH{-}CH_2{-}OSO_3Na + H_2O + CO_2$ where RCOO represents the acyl group of fatty acids used soap making.

(3) $2RO{-}CH_2{-}CH_2{-}SO_3H + Na_2SO_3 =$
$2RO{-}CH_2{-}CH_2{-}SO_3Na + H_2O + SO_2$ where R is an alkyl group containing eight or more carbon atoms.

(4) Acid sulfuric reaction products of petroleum fractions plus NaCl = Sodium salts of sulfuric acid reaction products of petroleum fractions plus HCl.

(5) $R'{-}OSO_3H + NaHCO_3 = ROSO_3Na + H_2O + CO_2$ where R' is a branched chain alkyl group with 8 or more C atoms.

(6) $2R{-}COOH + Na_2CO_3 = 2R{-}COONa + H_2O + CO_2$ where R—COO is the acyl group of a fatty acid used in soap making.

Alkyl half esters if sulphuric acid reacted with sodium chloride will yield sodium salts of the alkyl half esters of sulphuric acid and hydrochloric acid.

In the preferred form of my invention, the equipment consists of the following in series:

1. A mixing chamber consisting of a vertical cylindrical vessel, packeted and having set in the center a shaft with impellers or other suitable mixing device attached thereto.

2. A pump for removing the reaction products from the mixing chamber. This pump may be omitted if it is desired to have the materials removed by gravity, with a worm conveyor or any other suitable means.

3. A centrifugal for removal of the gas from the reaction mixture. The speed of the centrifugal may be any required to effect the separation, depending on the tenacity with which the gas or vapor is retained by the liquid.

4. A pump or other suitable means for transferring the liquid portion of the reaction products from the centrifugal. In some cases, the liquid discharged from the centrifugal may flow by gravity without mechanical transfer.

5. A temperature regulating device for controlling the temperature of the liquid. In most cases, heat removal is desired and may be secured in the usual manner by heat transfer through a metal jacket.

6. Suitable proportioning device for removal from the system an amount of liquid equivalent to that produced in the reaction and return of the remainder to the mixing chamber.

The operation is started with the mixing chamber filled with previously reacted material. With the agitator in operation, streams of the materials are continuously proportioned into the mixing chamber. Gas or vapor is evolved and is retained in whole or in part by the liquid. The reaction products are then continuously fed into the centrifugal, where the gas or vapor is separated from the liquid. The liquid is now passed to a temperature adjusting device, such as a heat exchanger, and thereafter is divided into two streams, one, equivalent in amount to the liquid produced in the operation, being removed from the system, and the other returned to the mixing chamber.

The proportioning of ingredients may be continuously controlled by proportioning devices acting on the flowing materials or by a continuously recording-controlling device which regulates the amount of one ingredient proportional to the amount of the other being added.

Example:

A mixture of coconut fatty acid monoglyceride monosulfuric acid and sulfuric acid was flowed continuously into a jacketed cylinder equipped with a mixing device consisting of a shaft with four turbo-agitators set at equal intervals, which was approximately filled with products of reaction, while at the same time a stream of 29% aqueous sodium carbonate solution was flowed in through a Micromax pH control equipment. By the latter device, the pH was maintained at 6.0–7.0. The reaction was complete when the ingredients reached the bottom of the mixing chamber. Therefrom, a pump forced the mixture through a centrifuge and the gas was removed. The liquid was passed through a heat exchanger and cooling secured sufficient that this cooling plus that secured from water flowing through the jacket of the mixing chamber maintained a temperature of 100° F. in the mixing chamber.

The cooled liquid was proportioned by a float valve in the mixing chamber, to return sufficient always to maintain in this chamber the desired level, while the remainder of the liquid was allowed to flow away from the system.

Having described my invention, I claim:

1. The process of removing gaseous by-products from readily foaming liquid phase reaction mixtures resulting from the neutralization of a sulphuric acid derivative of organic materials with an inorganic salt which comprises adding said sulphuric acid derivative and said salt to a liquid phase containing some already formed product, removing a portion of the reaction mixture including the salt of the organic sulphuric acid derivative formed by the reaction and the gaseous by-product, separating the gaseous by-product from this portion and returning a fraction of the gas-free salt of the organic sulphuric acid derivative to the reaction mixture.

2. The process of removing gaseous by-products from readily foaming liquid phase reaction mixtures which comprises adding the reactants to a liquid phase containing some already formed product, removing a portion of the reaction mixture including the product and gaseous by-product, separating the gaseous by-product from this portion and returning a fraction of the gas-free portion to the reaction mixture.

3. The continuous process of removing gaseous by-products from readily foaming liquid phase reaction mixtures which comprises continuously adding the reactants concomitantly to a liquid phase containing some already formed product, continuously removing a portion of the reaction mixture including the product and gaseous by-product, continuously separating the gaseous by-product from this portion and continuously returning a fraction of the gas-free portion to the reaction mixture.

4. The process of removing gaseous by-products from readily foaming liquid phase reaction mixtures which comprises adding the reactants to a liquid phase containing some already formed product, removing a portion of the reaction mixture including the product and gaseous by-product, separating the gaseous by-product from this portion, passing a fraction of the gas-free portion in indirect heat exchange relationship with a heat control medium and returning said fraction of the gas-free portion to the reaction mixture.

5. The process of removing gaseous by-products from readily foaming liquid phase reaction mixtures which comprises adding the reactants to a liquid phase containing some already formed product, removing a portion of the reaction mixture including the product and gaseous by-product, separating the gaseous by-product from this portion and returning a fraction of the gas-free portion to the reaction mixture at a rate substantially equivalent to the rate of formation of the product.

6. The process of removing gaseous by-products from readily foaming liquid phase reaction mixtures resulting from the neutralization of an acid detergent material which comprises adding the reactants to a liquid phase containing some already formed product, removing a portion of the reaction mixture including the product and gaseous by-product, separating the gaseous by-product from this portion and returning a fraction of the gas-free portion to the reaction mixture.

7. The process of removing gaseous by-products from readily foaming liquid phase reaction mixtures resulting from the reaction of sodium carbonate and a fatty acid which comprises adding the reactants to an aqueous liquid phase containing some already formed product, removing a portion of the reaction mixture including soap and carbon dioxide, separating the carbon dioxide from this portion and returning a fraction of the gas-free portion to the reaction mixture.

8. The process of removing gaseous by-products from readily foaming liquid phase reaction mixtures which comprises adding the reactants to a liquid phase containing some already formed product, removing a portion of the reaction mixture including the product and gaseous by-product, separating the gaseous by-product from this portion by centifuging of said portion and returning a fraction of the gas-free portion to the reaction mixture.

9. A process as defined in claim 6 wherein said acid detergent material is an alkyl half ester of sulphuric acid and said neutralizing agent is sodium carbonate.

10. A process as defined in claim 6 wherein said acid detergent material is a sulphonation product of a petroleum hydrocarbon material and said neutralizing agent is sodium sulphite.

11. The process of removing gaseous by-products from readily foaming liquid phase reaction mixtures resulting from the neutralization of fatty acid monoglyceride monosulphuric acid with sodium carbonate solution which comprises adding the reactants to a liquid phase containing some already formed product, removing a portion of the reaction mixture including the sodium salt of fatty acid monoglyceride monosulphuric acid and carbon dioxide, separating the carbon dioxide from this portion and returning a fraction of the gas-free portion to the reaction mixture.

12. The process of removing gaseous by-products from readily-foaming liquid phase reaction mixtures resulting from the neutralization of a sulphuric acid derivative of organic materials with an inorganic salt which comprises adding said sulphuric acid derivative and said salt to a liquid phase containing some already formed product, removing a portion of the reaction mixture including the salt of the organic sulphuric acid derivative formed by the reaction and the gaseous by-product, centrifugally separating the gaseous by-product from this portion and returning a fraction of the gas-free salt of the organic sulphuric acid derivative to the reaction mixture.

FRED WEAVER MUNCIE.

CERTIFICATE OF CORRECTION.

Patent No. 2,210,175.  August 6, 1940.

FRED WEAVER MUNCIE.

It is hereby certified that error appears in the printed specification of the above numbered patent requiring correction as follows: Page 2, first column, line 19, after "used" insert the word --in--; line 39, for "if" read --of--; line 46, for "packeted" read --jacketed--; page 3, second column, line 8, claim 8, for "centifuging" read --centrifuging--; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.